(12) United States Patent
Kelly

(10) Patent No.: US 11,340,011 B2
(45) Date of Patent: May 24, 2022

(54) REFRIGERATOR DRAWER WITH CASSETTE FILTER

(71) Applicant: Electrolux Home Products, Inc., Charlotte, NC (US)

(72) Inventor: Paul H. Kelly, Anderson, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 414 days.

(21) Appl. No.: 16/674,201

(22) Filed: Nov. 5, 2019

(65) Prior Publication Data

US 2021/0131721 A1    May 6, 2021

(51) Int. Cl.
*F25D 25/02* (2006.01)
*B01D 27/14* (2006.01)
*F25D 17/04* (2006.01)

(52) U.S. Cl.
CPC ......... *F25D 25/025* (2013.01); *B01D 27/148* (2013.01); *F25D 17/042* (2013.01)

(58) Field of Classification Search
CPC ................. F25D 25/025; F25D 17/042; F25D 2317/041; B01D 27/148; B01D 46/0006; B01D 46/0028; B01D 46/003; B01D 46/0036; B01D 46/12
See application file for complete search history.

(56) References Cited

U.S. PATENT DOCUMENTS

| | | |
|---|---|---|
| 2,514,902 A | 7/1950 | Sabath |
| 4,013,434 A | 3/1977 | Kronenberger et al. |
| 4,173,378 A | 11/1979 | Hanson et al. |
| 4,358,935 A | 11/1982 | Losert et al. |
| 4,788,832 A | 12/1988 | Aoki et al. |
| 4,860,555 A | 8/1989 | Bishop et al. |
| 4,954,465 A | 9/1990 | Kawashima et al. |
| 4,955,208 A | 9/1990 | Kawashima et al. |
| 5,253,488 A | 10/1993 | Kim et al. |
| 5,303,563 A | 4/1994 | Bishop et al. |
| 5,417,080 A | 5/1995 | Bishop et al. |
| 5,492,675 A | 2/1996 | Brizard |
| 6,173,580 B1 | 1/2001 | Rosenburg |
| 6,305,567 B1 | 10/2001 | Sulpizio |
| 6,346,143 B1 | 2/2002 | McGowan |
| 6,367,276 B1 | 4/2002 | Kim et al. |
| 6,862,980 B2 | 3/2005 | Heil et al. |

(Continued)

FOREIGN PATENT DOCUMENTS

| | | |
|---|---|---|
| WO | 2014154563 | 10/2014 |
| WO | 2015074527 | 5/2015 |

*Primary Examiner* — Emmanuel E Duke
(74) *Attorney, Agent, or Firm* — Pearne & Gordon LLP

(57) ABSTRACT

A crisper drawer for a refrigerator having a refrigerated compartment is disclosed. The crisper drawer includes a plurality of side walls defining a storage chamber, an opening in a side wall to provide fluid communication between the storage chamber and the refrigerated compartment, and a multi-function filter cassette configured to be positioned within the opening. The multi-function filter cassette includes a first filter configured to remove contaminants from a first air flow within the refrigerated compartment, a second filter configured to remove contaminants and/or moisture from a second air flow within the storage chamber, and a central wall configured to prevent fluid communication between the refrigerated compartment and the storage chamber.

20 Claims, 12 Drawing Sheets

(56) References Cited

U.S. PATENT DOCUMENTS

| | | |
|---|---|---|
| 6,923,015 B2 | 8/2005 | Ueno et al. |
| 6,926,862 B2 | 8/2005 | Fontenot et al. |
| 7,005,000 B2 | 2/2006 | Stiros et al. |
| 7,296,422 B2 | 11/2007 | Strohm et al. |
| 7,624,593 B2 | 12/2009 | Lee et al. |
| 7,654,102 B2 | 2/2010 | Hurlebaus et al. |
| 7,662,214 B1 | 2/2010 | Wickham et al. |
| 7,824,480 B2 | 11/2010 | Hurlebaus et al. |
| 7,845,181 B2 | 12/2010 | Evans et al. |
| 8,057,586 B2 | 11/2011 | Powers et al. |
| 8,517,483 B2 | 8/2013 | Eubanks et al. |
| 8,590,334 B2 | 11/2013 | Kim et al. |
| 8,979,981 B1 | 3/2015 | Givler |
| 9,303,917 B2 | 4/2016 | Park et al. |
| 9,480,267 B2 | 11/2016 | Arrigo |
| 9,482,459 B2 | 11/2016 | Park et al. |
| 9,497,977 B2 | 11/2016 | Biotti et al. |
| 9,527,638 B2 | 12/2016 | Yoo et al. |
| 9,586,745 B1 | 3/2017 | Givler |
| D786,949 S | 5/2017 | Onrat |
| 9,803,909 B2 | 10/2017 | Son et al. |
| 9,903,634 B2 | 2/2018 | Son et al. |
| 2003/0019362 A1 | 1/2003 | Stiros et al. |
| 2003/0046947 A1 | 3/2003 | Ohya et al. |
| 2004/0033162 A1 | 2/2004 | Kunstadt et al. |
| 2005/0183637 A1 | 8/2005 | Reeser |
| 2005/0214245 A1 | 9/2005 | Kim et al. |
| 2007/0098673 A1 | 5/2007 | Kim et al. |
| 2007/0224157 A1 | 9/2007 | Kim et al. |
| 2011/0203226 A1 | 8/2011 | Bonneh |
| 2011/0229542 A1* | 9/2011 | Cundell ............... A01N 65/48 424/737 |
| 2012/0198862 A1 | 8/2012 | Arrigo |
| 2014/0157990 A1* | 6/2014 | Piry ............... B01D 46/0028 96/226 |
| 2014/0360213 A1 | 12/2014 | Son et al. |
| 2015/0289528 A1 | 10/2015 | Gooden et al. |
| 2016/0377337 A1 | 12/2016 | Kluger et al. |
| 2017/0003065 A1 | 1/2017 | Biotti et al. |
| 2017/0191728 A1 | 7/2017 | Seo |
| 2017/0336128 A1* | 11/2017 | de Cavalcanti ....... F25D 17/042 |
| 2018/0133638 A1* | 5/2018 | Shafer ............... B01D 46/0035 |
| 2018/0161716 A1* | 6/2018 | Li ...................... B01D 46/12 |
| 2019/0128587 A1* | 5/2019 | Murray ................ A61L 9/014 |
| 2019/0186805 A1* | 6/2019 | Ulsaker ............. B01D 46/0012 |
| 2019/0293342 A1* | 9/2019 | Butenhoff ............. B65D 81/24 |

* cited by examiner

REFRIGERATOR DRAWER WITH CASSETTE FILTER

CROSS-REFERENCE TO RELATED APPLICATIONS

None

FIELD OF THE INVENTION

This application relates generally to a crisper drawer for a refrigeration appliance, and more particularly, to a crisper drawer including a cassette filter.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The compartments are generally separated by a partition that is either vertically or horizontally oriented depending on the specific configuration of the refrigerator.

Generally, crisper drawers and storage bins are located within the fresh food and freezer compartments in order to more efficiently organize and compartmentalize the items stored in said compartments. Fruits and vegetables stored in such drawers and bins release ethylene gas over time that results in wilting, decay, loss of crunch, and other negative effects on other foods stored nearby. Additionally, microbes and excess moisture also have negative effects on food stored within a refrigerator. Ethylene absorbers are currently used to extend the freshness of fruits and vegetables stored in the crisper drawer(s) by removing ethylene gas from the air. Ethylene absorbers for crisper drawers in refrigerators currently require components that must be adhered to or placed inside of the drawer, which results in the loss of usable space within the crisper drawer.

Accordingly, there is a need for a housing for an ethylene absorber that is integrated into a side wall of a crisper drawer, thus utilizing traditional void space in the drawer. The disclosed housings reduce or avoid the loss of space inside the drawer, in addition to maintaining the freshness of produce stored in the crisper drawer.

BRIEF SUMMARY OF THE INVENTION

In accordance with one aspect, there is provided a crisper drawer for a refrigerator having a refrigerated compartment, the crisper drawer comprising a plurality of side walls defining a storage chamber, an opening in a side wall to provide fluid communication between the storage chamber and the refrigerated compartment, and a multi-function filter cassette configured to be positioned within the opening. The multi-function filter cassette includes a first filter configured to remove contaminants from a first air flow within the refrigerated compartment, a second filter configured to remove contaminants and/or moisture from a second air flow within the storage chamber, and a central wall configured to prevent fluid communication between the refrigerated compartment and the storage chamber.

In accordance with another aspect, there is provided a multi-function filter cassette comprising a first filter configured to remove contaminants from a first air flow within a first compartment, a second filter configured to remove contaminants and/or moisture from a second air flow within a second compartment adjacent to the first compartment, and a central wall configured to hold the first filter and to hold the second filter, and further configured to prevent fluid communication between the first and second compartments.

DESCRIPTION OF EXAMPLE EMBODIMENTS

Figure 1:
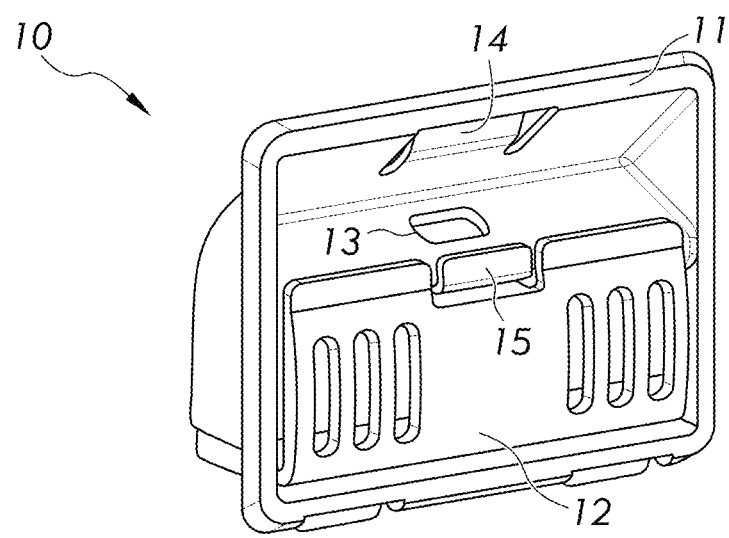
FIG. 1 is a perspective view of one example housing for storing an absorbent material in a crisper drawer.

Apparatus will now be described more fully hereinafter with reference to the accompanying drawings in which embodiments of the disclosure are shown. Whenever possible, the same reference numerals are used throughout the drawings to refer to the same or like parts.

Figure 2:
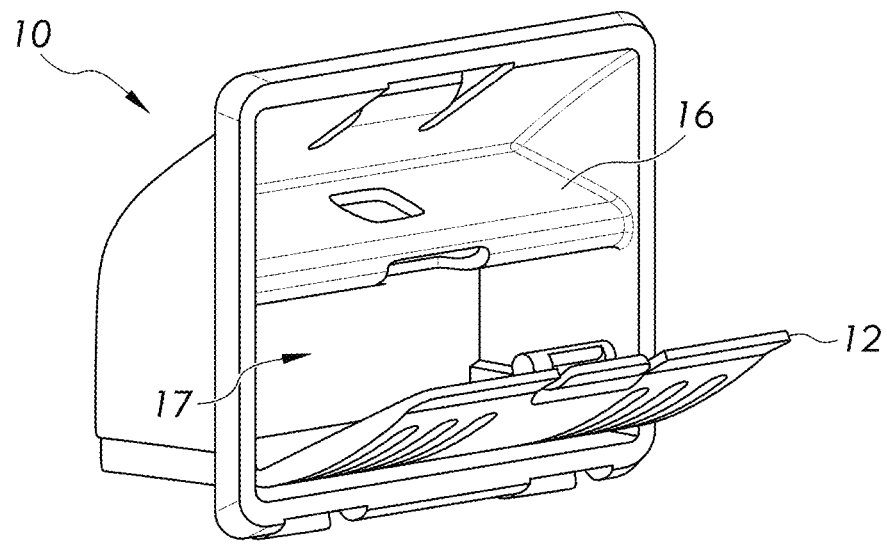
FIG. 2 is a perspective view of the housing of FIG. 1 with a door opened to reveal an interior compartment.
Figure 3:
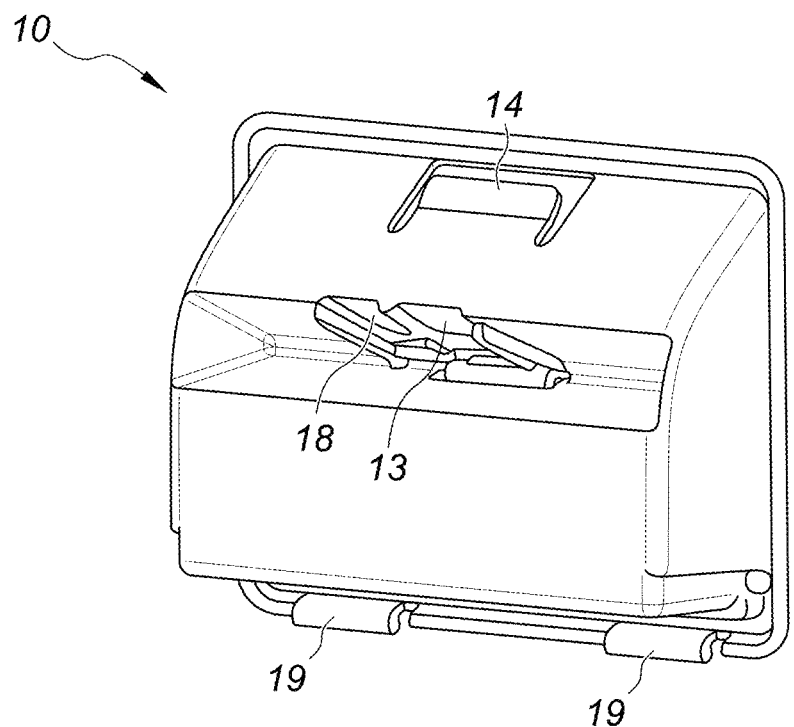
FIG. 3 is a perspective view of the back of the housing of FIG. 1.

An example of a housing 10 for storing ethylene-absorber packs that is used in a crisper drawer is shown in FIGS. 1-3. In this embodiment, the housing 10 includes an interior compartment 17 for storing one or more ethylene-absorber packs. Each ethylene-absorber pack includes a permeable, flexible, or rigid container that contains an ethylene-absorbing agent to remove ethylene gas that is produced by food items stored in the crisper drawer, such as fruits and vegetables. The interior compartment 17 includes openings on a lower interior portion that are configured to accommodate hinges on a door 12, which provides access to the interior compartment 17 when opened. In the embodiment shown in FIGS. 1 and 2, the door 12 includes a plurality of open vents on either side of a snap tab 15 that allow air to flow between the interior compartment 17 (and the stored ethylene-absorber pack(s)) and a storage chamber of the crisper drawer when the door 12 is closed. The tab 15 on the door 12 is flexible and configured to be snap-fit into a notch on a shelf 16 to secure the door 12 in a closed position. As shown in FIG. 3, the rear of the housing 10 further includes a slot 18 that is configured to accept a timer strip that is used to monitor the life of the ethylene-absorber packs within the interior compartment 17. For example, the timer strip may include a chemical indicator that changes color after a predetermined length of time after being exposed to air. In this example, the chemical indicator of the timer strip in configured to change color at a time that corresponds with the useful life of the ethylene-absorbing agent. A window 13 on the shelf 16 is an opening that displays the indicator on the timer strip on a front side of the housing 10. When the chemical indicator of the timer strip changes color, this indicates to the user that the existing ethylene-absorber pack has reached the end of its useful life and should be replaced with a new ethylene-absorber pack in order to maintain efficient absorption of ethylene gas within the crisper drawer.

In order to replace an existing ethylene-absorber pack, the snap tab 15 is released and the door 12 is rotated on its hinges away from the housing to an open position and the existing ethylene-absorber packs are removed. After new ethylene-absorber packs are placed within the interior compartment 17, the door 12 is rotated on its hinges toward the housing to a closed position until the tab 15 is snap-fit into the notch on the shelf 16, thus securing the door 12 in place.

The housing 10 is configured to be snap-fit into an opening in a side wall of a crisper drawer. The back of the housing 10 includes a snap tab 14 that is configured to lock the housing 10 into place. To install the housing 10 into a crisper drawer, a bottom wall of the housing 10 is inserted into an opening in the side wall of the crisper drawer. An upper portion of the housing 10 (i.e., the portion nearest the snap tab 14) is then rotated toward the side wall of the crisper drawer and secured into place when the snap tab 14 is positioned on one side of the side wall and a circumferential rim 11 of the housing 10 is positioned on the other side of the side wall. Once the housing 10 is snap-fit into the opening in the side wall, the front face of the housing 10 (i.e., the face with the door 12) is flush with the side wall of the crisper drawer, thus maximizing the amount of storage within the crisper drawer.

Figure 4:
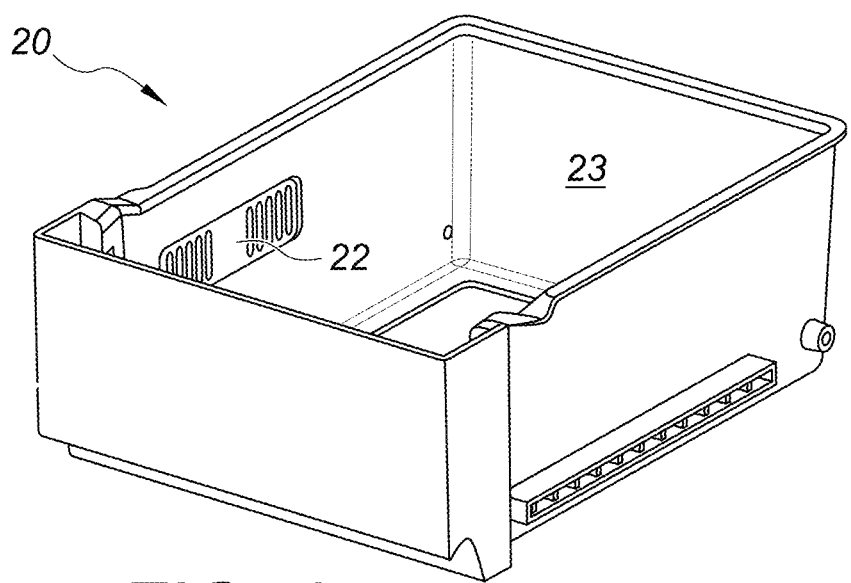
FIG. 4 is a perspective view of a crisper drawer including an example vented housing within a recessed cavity for storing an absorbent material.
Figure 5:
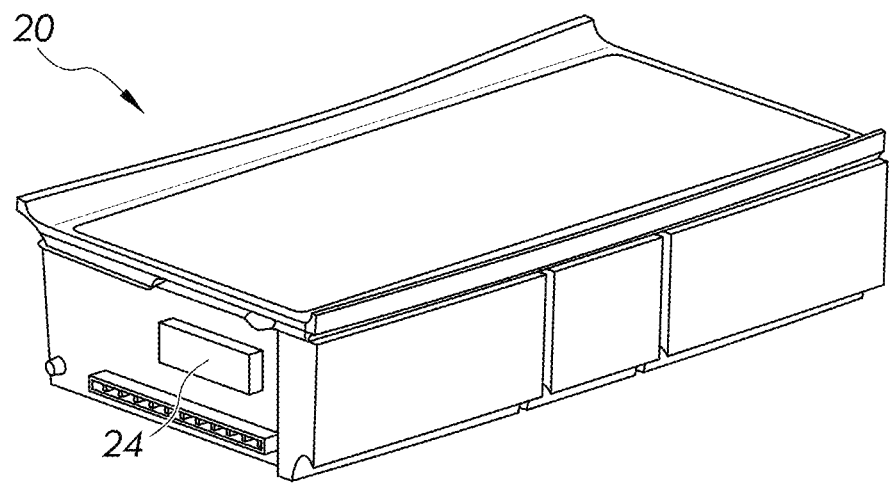
FIG. 5 is a perspective view of the crisper drawer of FIG. 4, located within a housing, showing an exterior projection of the recessed cavity.
Figure 6:
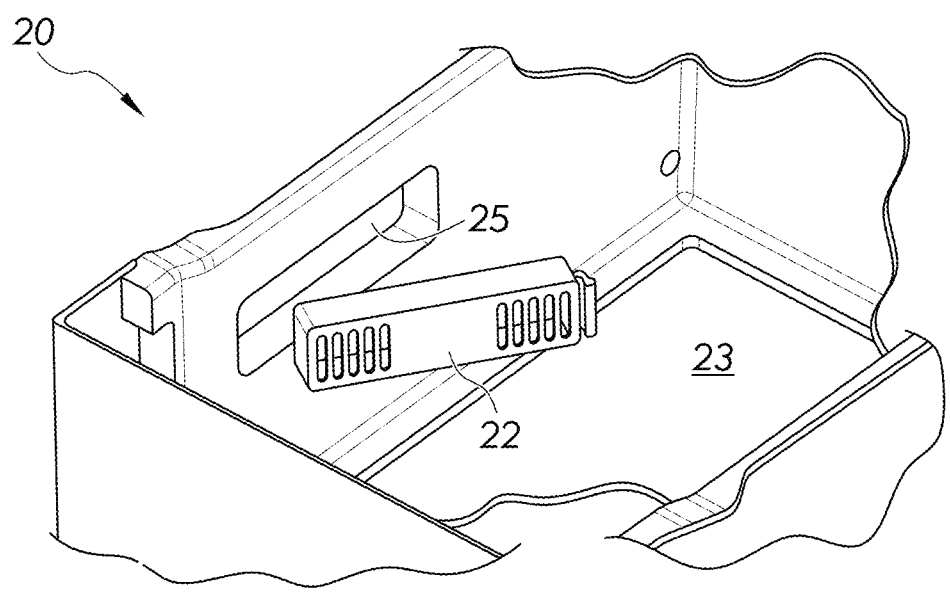
FIG. 6 is an enlarged view of the vented housing and the recessed cavity of the crisper drawer of FIG. 4.

In a second embodiment, another example of a housing 22 that is used in a crisper drawer is shown in FIGS. 4-6. In this embodiment, a crisper drawer 20 includes a cavity 25 in a side wall. The cavity 25 is configured to store one or more ethylene-absorber packs. A housing 22 is similarly sized and configured to fit within the cavity 25. While the embodiment illustrated in FIGS. 4-6 includes a cavity 25 with a rectangular-shaped opening, the opening of the cavity 25 could be any other shape, such as square, circular, triangular, etc. The housing 22 includes a snap-release tab along a side portion that is configured to snap fit within a recess in the cavity 25 to secure the housing 22 in place, and thus keep the ethylene-absorber packs within the cavity 25. In this example, the housing 22 includes vertical vents to allow air to flow between the storage chamber 23 of the crisper drawer 20 and the cavity 25. By positioning the cavity 25 and housing 22 within the side wall of the crisper drawer 20, the loss of space within the crisper drawer 20 is minimized, as compared to ethylene-absorbing devices that are adhered to an interior surface of the side wall of the crisper drawer. Preferably, the housing 22 is flushed or recessed in the wall of the crisper bin (as shown in FIG. 4) when fully installed.

As shown in FIG. 5, a back portion of the cavity 25 extends from the exterior of the side wall as a protrusion 24. Preferably, the cavity 25 is sealed at the exterior of the crisper bin. However, the protrusion 24 does not extend past the total width of the crisper drawer 20 in order to not interfere with positioning of the crisper drawer 20 within a refrigerator.

Turning to yet another embodiment, an example of a multi-function filter cassette 30 that is used in a crisper drawer is shown in FIGS. 7-12. In one embodiment, the multi-function filter cassette 30 is configured to hold at least two filters 39, 42, one of which is exposed to a storage chamber within a crisper drawer and one of which is exposed to a storage compartment within a refrigerator. In this embodiment, the multi-function filter cassette 30 provides air quality filtration and food preservation within the crisper drawer and separate air quality filtration to the environment outside of the crisper drawer. For example, the filters can include a material to remove contaminants, such as an antimicrobial agent to eliminate or reduce bacteria, an ethylene-absorbing material to absorb and reduce ethylene gas, and/or activated carbon for unit air freshening, and/or a moisture-wicking material to remove excess moisture and maintain humidity. Each of the filters 39, 42 can include any one or more of these agents/materials, and the filters 39, 42 can include different agents/materials. For example, when the filter 39 is exposed to the storage chamber of the crisper drawer and the filter 42 is exposed to the storage compartment of the refrigerator, the filter 39 can include an ethylene-absorbing material and the filter 42 can include activated carbon. In this embodiment, the filter 39 would provide air quality filtration and food preservation within the crisper drawer (including the previously described ethylene absorption) and the filter 42 would provide air quality filtration to the environment outside of the crisper drawer.

In another embodiment, the multi-function filter cassette 30 is configured to hold one filter that is exposed to a storage chamber within a crisper drawer and/or a storage compartment within a refrigerator. In this embodiment, the single filter includes two or more filter medium, such as a material to remove contaminants (e.g. an antimicrobial agent to eliminate or reduce bacteria, an ethylene-absorbing material to absorb and reduce ethylene gas, and/or activated carbon for unit air freshening), and/or a moisture-wicking material to remove excess moisture and maintain humidity.

Figure 7:
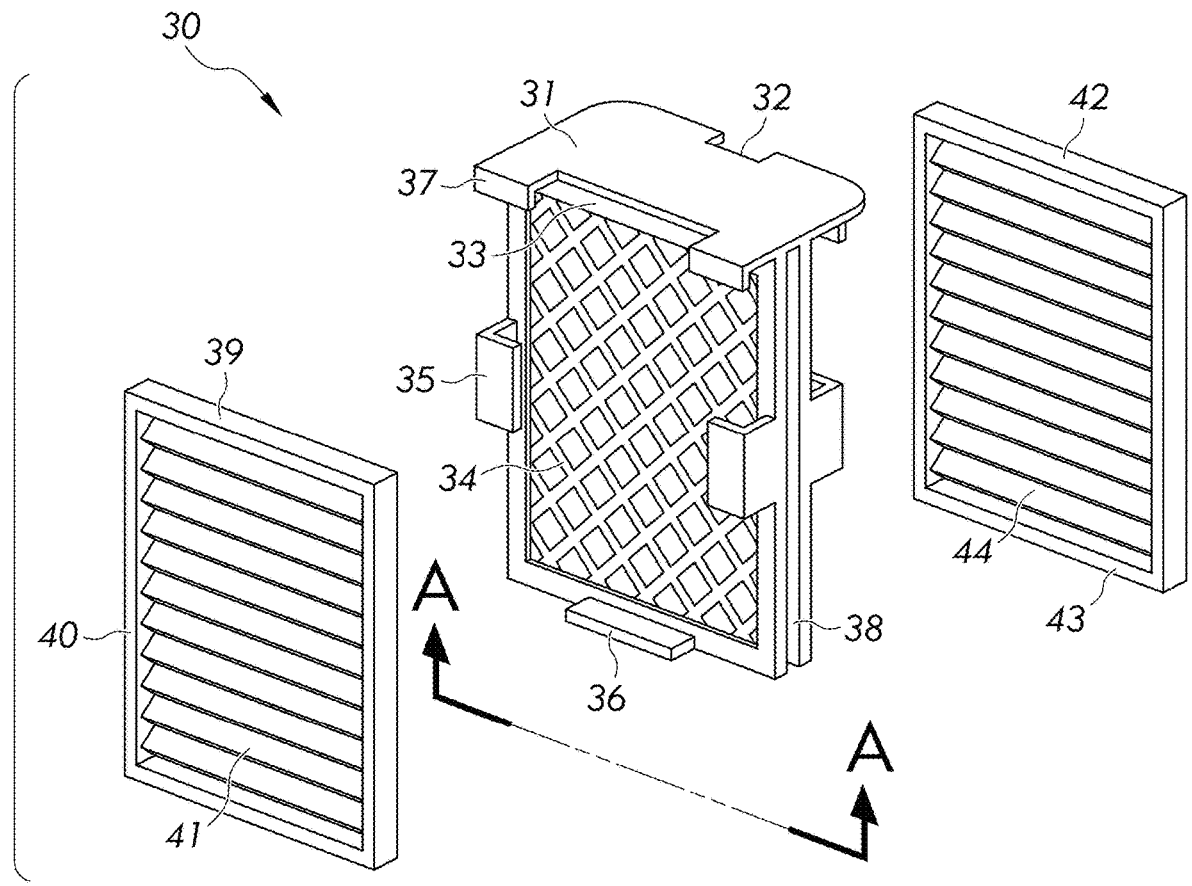
FIG. 7 is a perspective view of an example multi-function filter cassette and first and second filters.
Figure 8:
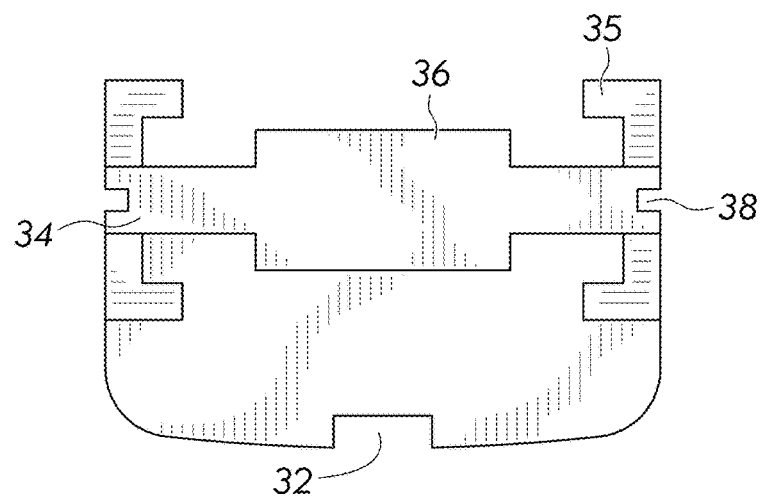
FIG. 8 is a bottom view of the multi-function filter cassette taken along the direction indicated by arrow A in FIG. 7.

As shown in FIGS. 7 and 8, the multi-function filter cassette 30 includes a horizontal top wall 31 and a vertical central wall 34. In this embodiment, the top wall 31 includes notches 32, 33 on opposing edges. In other embodiments, like that shown in FIG. 11, the top wall 31 of the multi-function filter cassette 30 includes a tab 29 that extends from the top wall 31. The notches 32, 33 and the tab 29 on the top wall 31 allow a user to grasp the multi-function cassette 30 for removal from a side wall of the crisper drawer.

In one embodiment, the central wall 34 includes flanges 35, 36, 37 on a front face and corresponding flanges on a back face. The flanges 35, 36, 37 on the front face of the central wall 34 are configured to hold the filter 39 while the corresponding flanges on the back face of the central wall 34 are configured to hold the filter 42. The flanges 35, 36, 37 may be similar or different depending upon the geometry of the filter media to be retained. In one embodiment, the central wall 34 further includes vertical slots 38 (as shown) on opposing side edges that extend nearly the entire length of the multi-function filter cassette 30. In another embodiment, the central wall 34 further includes projecting vertical rails (not shown) on opposing side edges that extend nearly the entire length of the multi-function filter cassette 30. The wall 34 can have both slots 38 and rails. The vertical slots 38 or rails are configured to secure the multi-function cassette 30 in place within an opening 45 in a side wall of the crisper drawer.

Figure 9:
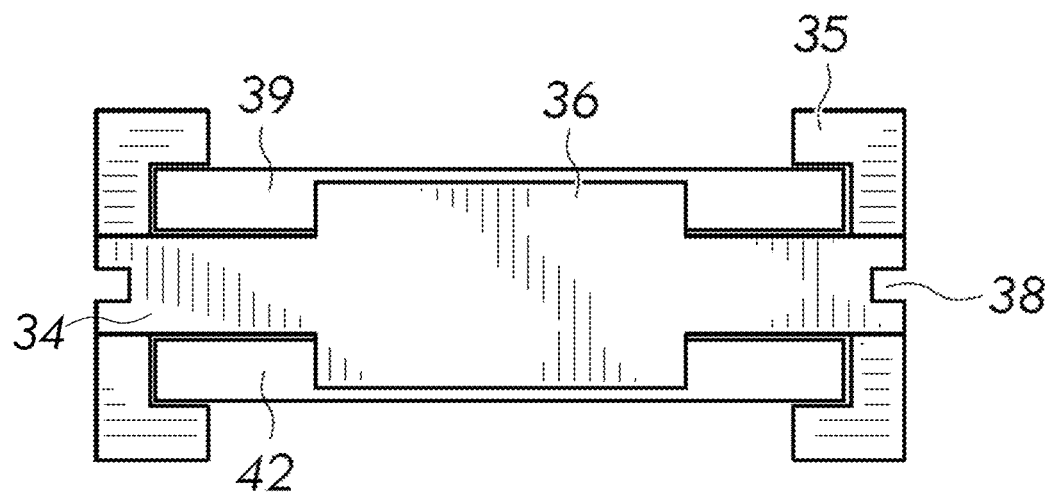
FIG. 9 is a is a bottom view of another embodiment of the multi-function filter cassette of FIG. 7 taken along the direction indicated by arrow A in FIG. 7.
Figure 10:
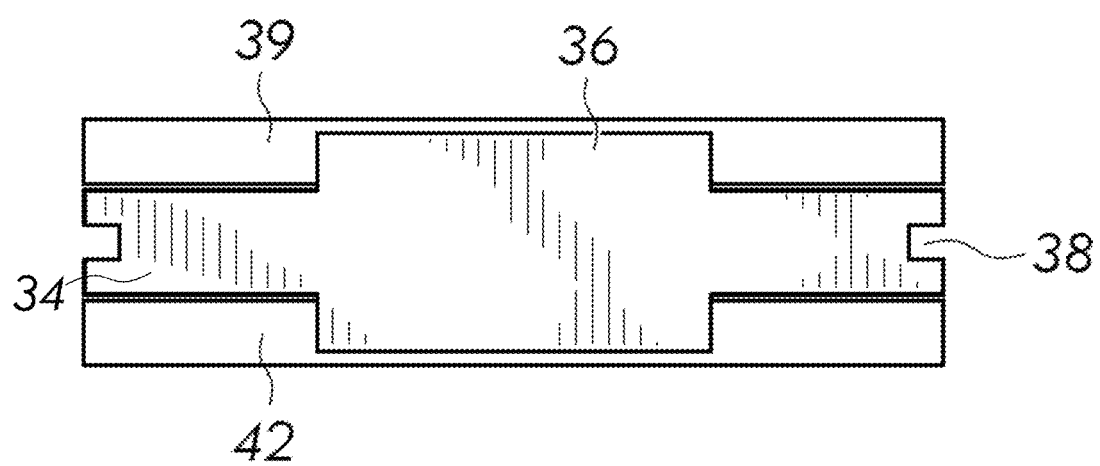
FIG. 10 is a bottom view of another embodiment of the multi-function filter cassette of FIG. 7 taken along the direction indicated by arrow A in FIG. 7.

FIGS. 9 and 10 show additional embodiments of the multi-function filter cassette 30 that do not include a top wall 31. Instead, the embodiment shown in FIG. 9 includes a central wall 34 with flanges 35 and 36 on a front face and corresponding flanges on a back face. The flanges 35 and 36 on the front face of the central wall 34 are configured to hold the filter 39 while the corresponding flanges on the back face of the central wall 34 are configured to hold the filter 42. The flanges 35 and 36 may be similar or different depending upon the geometry of the filter media to be retained. In one embodiment, the central wall 34 further includes vertical slots 38 (as shown) on opposing side edges that extend nearly the entire length of the multi-function filter cassette 30. In another embodiment, the central wall 34 further includes projecting vertical rails (not shown) on opposing side edges that extend nearly the entire length of the multi-function filter cassette 30. The wall 34 can have both slots 38 and rails. The vertical slots 38 or rails are configured to secure the multi-function cassette 30 in place within an opening 45 in a side wall of the crisper drawer.

The embodiment shown in FIG. 10 includes a central wall 34 with flange 36 on a front face and a corresponding flange on a back face. The flange 36 on the front face of the central wall 34 is configured to hold the filter 39 while the corresponding flange on the back face of the central wall 34 is configured to hold the filter 42. The flanges 36 may be similar or different depending upon the geometry of the filter media to be retained. In one embodiment, the central wall 34 further includes vertical slots 38 (as shown) on opposing side edges that extend nearly the entire length of the multi-function filter cassette 30. In another embodiment, the central wall 34 further includes projecting vertical rails (not shown) on opposing side edges that extend nearly the entire length of the multi-function filter cassette 30. The wall 34 can have both slots 38 and rails. The vertical slots 38 or rails are configured to secure the multi-function cassette 30 in place within an opening 45 in a side wall of the crisper drawer.

In one embodiment, the filters 39, 42 each include filter material 41, 44 within a filter frame 40, 43. In another embodiment, the filters 39, 42 include self-supporting filter materials 41, 44 that do not require filter frames 40, 43. In one embodiment, the filters 39, 42 are configured to snap-fit to the front face and back face of the multi-function filter cassette 30, respectively, within one or more of the flanges 35, 36, 37. In other embodiments, the filters 39, 42 are configured to be attached to the front and back faces of the multi-function filter cassette 30, respectively, via adhesive or hook-and-loop fasteners on the filter frames 40, 43 or on the self-supporting filter materials 41, 44. The filters 39, 42 are configured to be individually detachable and mounted to the multi-function filter cassette 30 in order to allow the filters to be replaced after reaching the end of each filter's useful life.

Figure 11:
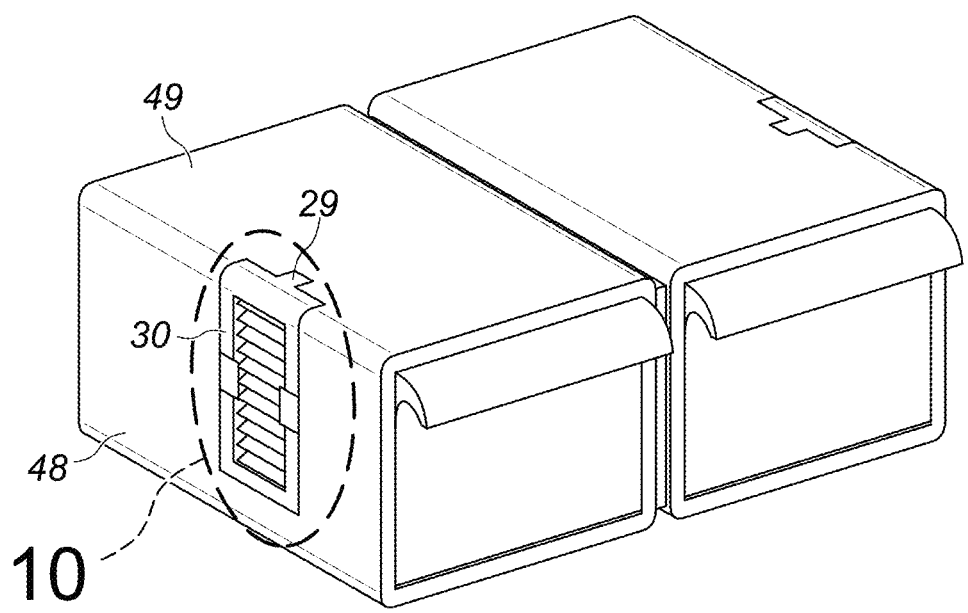
FIG. 11 is a perspective view of a crisper drawer with the multi-function filter cassette of FIG. 7 positioned on a side wall.
Figure 12:
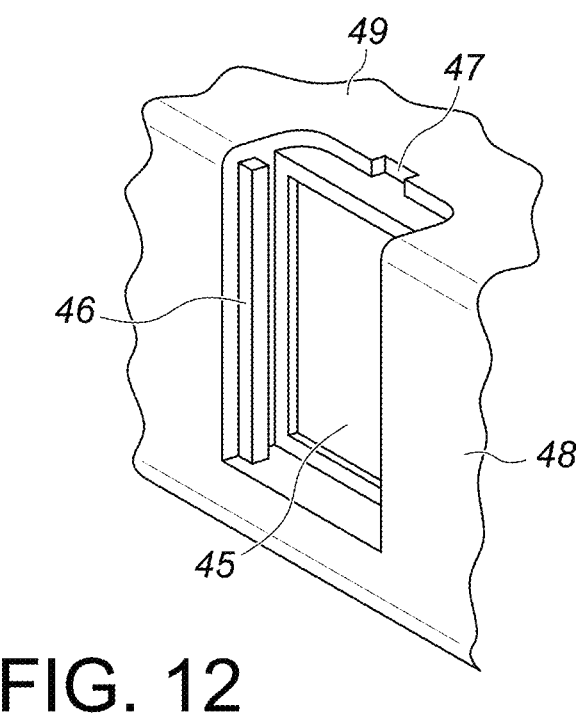
FIG. 12 is an enlarged view of the crisper drawer of FIG. 11 with the multi-function filter cassette removed to show an opening in the side wall.

As shown in FIGS. 11 and 12, the multi-function filter cassette 30 is configured to fit into a through opening 45 in a side wall of a crisper drawer that permits fluid communication between the storage chamber of the crisper drawer and the storage compartment of the refrigerator. In this embodiment, the multi-function filter cassette 30 is configured to fit in the opening 45 in the side walls 48, 49 of the crisper drawer. When the multi-function filter cassette 30 is positioned in the opening 45, one of the faces of the multi-function filter cassette 30 (i.e. the front face or the back face) is preferably flush with the exterior of the crisper drawer. In one embodiment, the opening 46 includes vertical rails 46 that are configured to fit within the vertical slots 38 of the multi-function filter cassette 30 in order to secure the cassette in place. In another embodiment, the vertical rails of the multi-function filter cassette 30 are configured to fit within slots on opposing sides of the opening 46 in order to secure the cassette in place. In the embodiment shown in FIGS. 11 and 12, the tab 29 that extends from the top wall 31 of the multi-function filter cassette 30 is configured to fit within a notch 47 of the opening 45. The tab-and-notch interlocking system helps to maintain the positioning of the multi-function filter cassette 30 within the opening 45 and also allows a user to grasp the cassette for removal in order to replace the filters 39, 42. When positioned in the opening 45, the multi-function filter cassette 30 effectively completes the wall 48 and closes the opening 45 to thereby block the fluid communication of air between the refrigerated storage compartment and the storage chamber (e.g., between the refrigerated fresh food compartment and the interior of the crisper drawer). Specifically, the central wall 34 of the multi-function filter cassette 30 blocks air from passing between the storage compartment within the crisper drawer and the fresh food compartment of the refrigerator. When fully installed, the filter 42 is exposed to the interior of the crisper drawer and the filter 39 is exposed to the fresh food compartment of the refrigerator.

Figure 13:
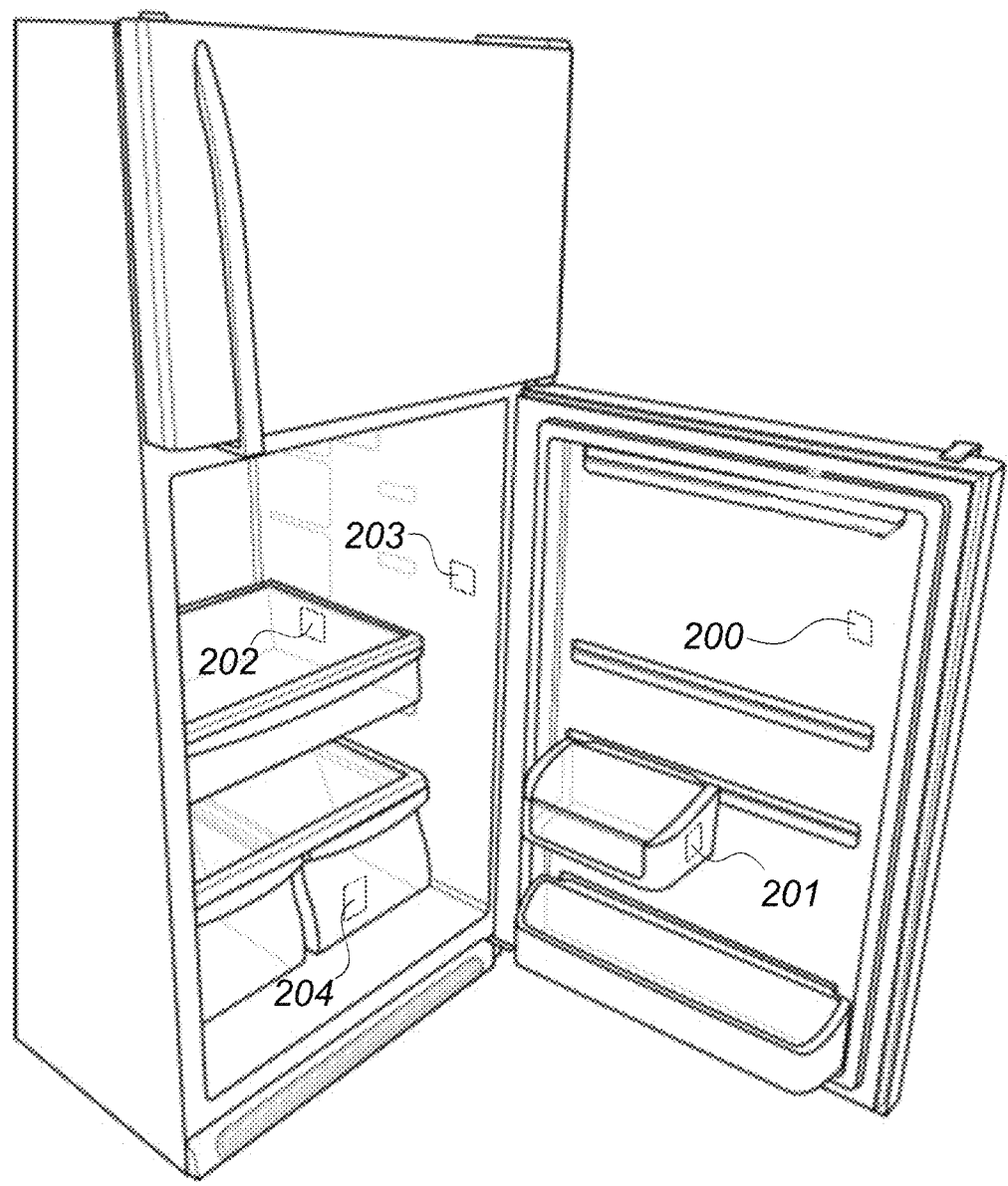
FIG. 13 is a perspective view of a compartment of a refrigerator with additional openings/slots for the multi-function filter cassette.

In addition to use within a crisper drawer, the multi-function filter cassette 30 may also be used in other areas within a refrigeration appliance. As shown in FIG. 13, the cassette 30 may be incorporated into other compartments within the refrigeration appliance, such as an opening or slot 202, 204, 203 within a deli drawer, fresh drawer, or sidewall of the appliance, respectively. Other compartments within the refrigeration appliance may include an opening that is sized to receive the cassette 30.

Additionally, the cassette 30 may be used in a opening or slot 200, 201 on a door or a door compartment, respectively, of the refrigeration appliance. A wall of the door of the refrigeration appliance may include an opening or slot 200, similar to the opening 45 shown in the crisper drawer of FIG. 12, wherein the cassette 30 may be placed in order to expose a filter to the interior space of the refrigeration appliance. In other embodiments, the door may include a compartment, such as a butter compartment, that features an opening or slot 201 wherein the cassette 30 may be placed. In other embodiments, the door or door compartment may include rails that are configured to receive the cassette 30.

In other embodiments, a support structure that forms a compartment may include a slot or opening that is configured to receive the cassette 30. In one embodiment, an interior wall of the refrigeration appliance may feature support structures (e.g. molded portions) that form a compartment on the interior wall. In this embodiment, the support structure includes a slot or opening that is configured to receive a cassette 30.

Figures 14A, 14B, 14C:
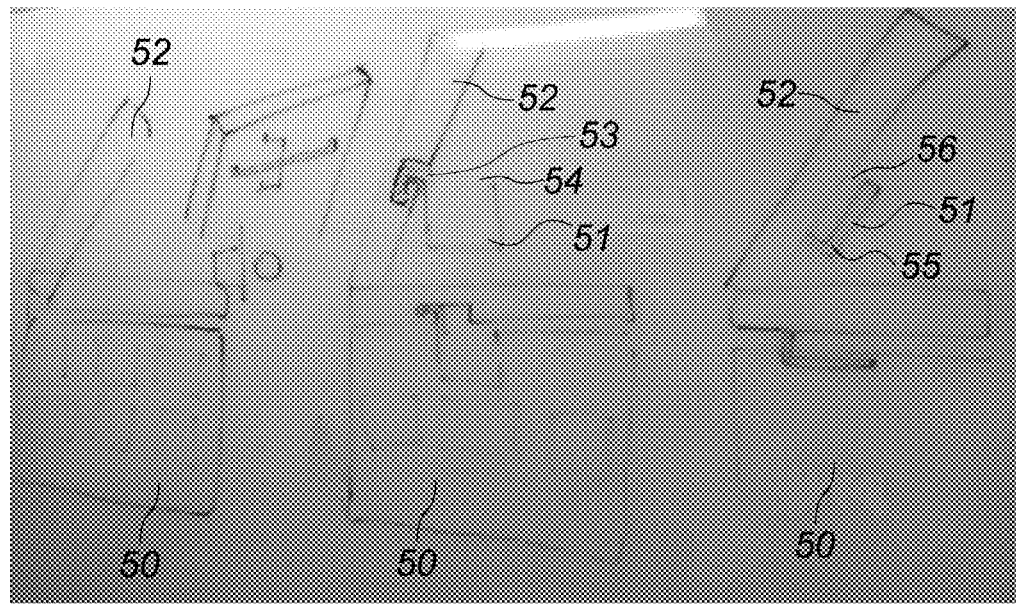
FIGS. 14A-14C are side views of a storage basket suspended from an underside of a lid that encloses a top of a chest freezer.
Figure 15:
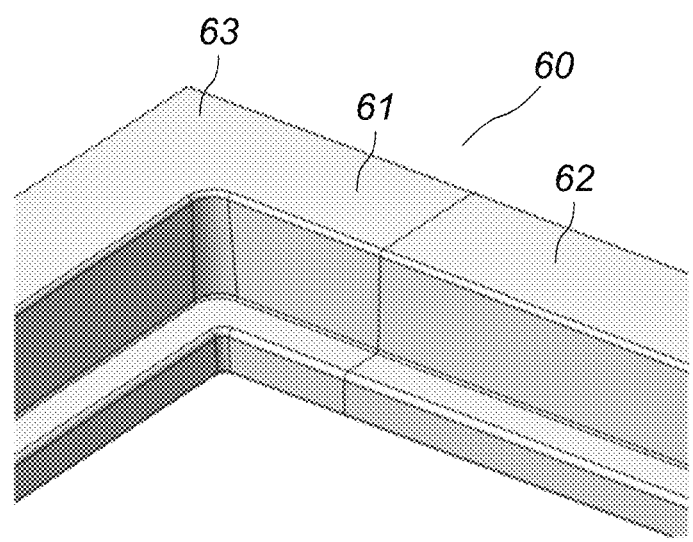
FIGS. 15-18 are perspective views of a breaker formed from flush, end-aligned interlocking segments connected together by snap-fit connectors to form a sealing surface for a freezer.

In a separate embodiment, as shown in FIGS. 14A-C, a chest freezer 50 includes a storage basket 51 suspended from an underside of a lid 52 that encloses the top of the freezer 50. In one embodiment, as shown in FIG. 14B, the storage basket 51 is configured to pivot from the lid 52. A hinged connection 53 allows the basket 51 to pivot relative to the lid 52 to maintain the orientation of the basket 51 with its opening 54 facing up while the lid 52 is in the open orientation and in the closed orientation, as well as at various positions in between. In another embodiment, as shown in FIG. 14C, the basket 51 is fixedly connected to the underside of the lid 52 and has a constant orientation relative to the lid 52. According to the embodiment shown in FIG. 14C, the basket 51 includes sides 55 that define an opening 56 that faces upward while the lid 52 is in the open orientation and faces forward, toward the front of the chest freezer 50 while the lid 52 is in the closed orientation.

Figure 16:
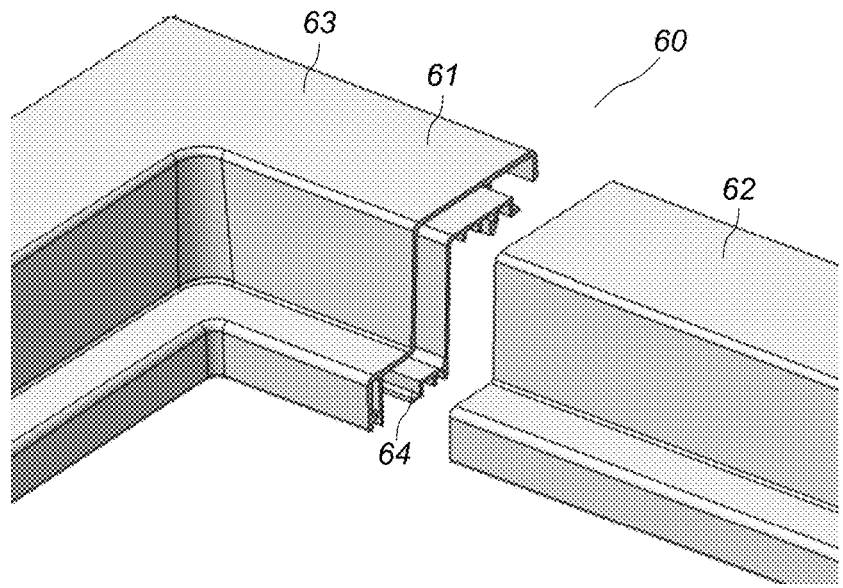
Figures 17, 18:
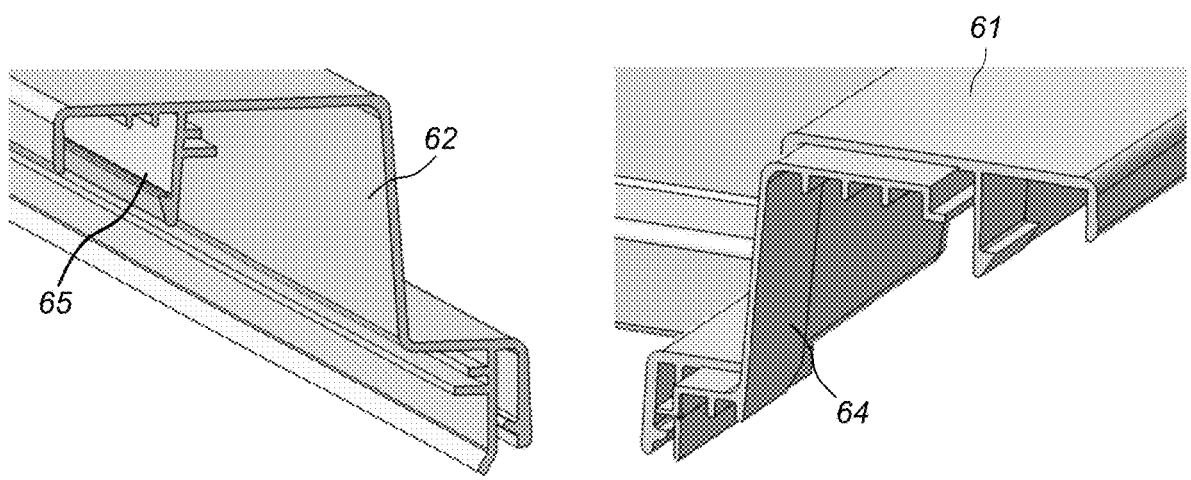

In a separate embodiment, as shown in FIGS. 15-18, a breaker 60 for a chest freezer is formed from interlocking segments 61 and 62 that, when connected, form a sealing surface 63 for a lid of the freezer. Prior breaker designs included neighboring segments connected by an overlapping joint to form a step along the sealing surface against which a gasket on the lid is compressed while the lid is closed. In contrast, the disclosed embodiment includes segments 61 and 62 that lock together with a snap-fit connection. As shown in FIGS. 16-18, the end of one segment 61 has a male connector 64 that cooperates with a female connector 65 portion at the opposing end of the neighboring segment 61. When the segments 61 and 62 are connected to collectively form the breaker 60, a portion of the sealing surface 63 provided to each segment is end-aligned to be flush with, and abut against the portion of the sealing surface provided to the contiguous breaker segment. The cooperation between the male and female connectors 64 and 65 locks the segments 61 and 62 together to prevent the formation of gaps during thermal expansion of foam insulation. An extruded collar is installed over the joint formed between the two abutting portions of the breaker 60.

Figure 19:
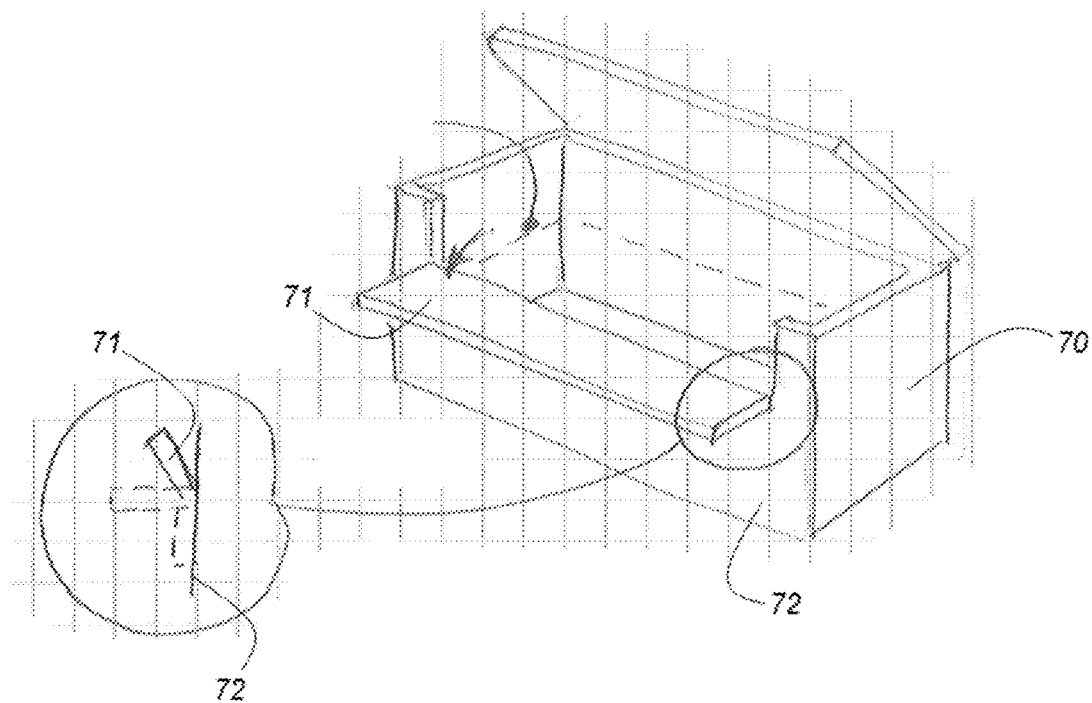
FIG. 19 is a perspective schematic of a chest freezer with a hinged front panel that opens and folds down to serve as a shelf or to be flush with a sidewall of the freezer.

In a separate embodiment, as shown in FIG. 19, a freezer 70 comprises a top edge 71 that is hinged to a front wall 72 of the freezer. The top edge 71 is configured to be folded 90 degrees to a horizontal position to form a shelf, or 180 degrees to be flush with the front wall 72 of the freezer. Although the embodiment shown in FIG. 19 shows the top edge 71 on the front wall 72 of the freezer, any of the walls of the freezer may be configured to fold down to form a shelf or be flush with a side wall of the freezer 70. When the top edge 71 is folded down 90 degrees, a user may place items removed from the freezer 70 onto the shelf in order to access additional items stored in the freezer 70. When the top edge 71 is folded down 180 degrees, the user has easier access to items positioned at or near the bottom of the freezer 70.

Figure 20:
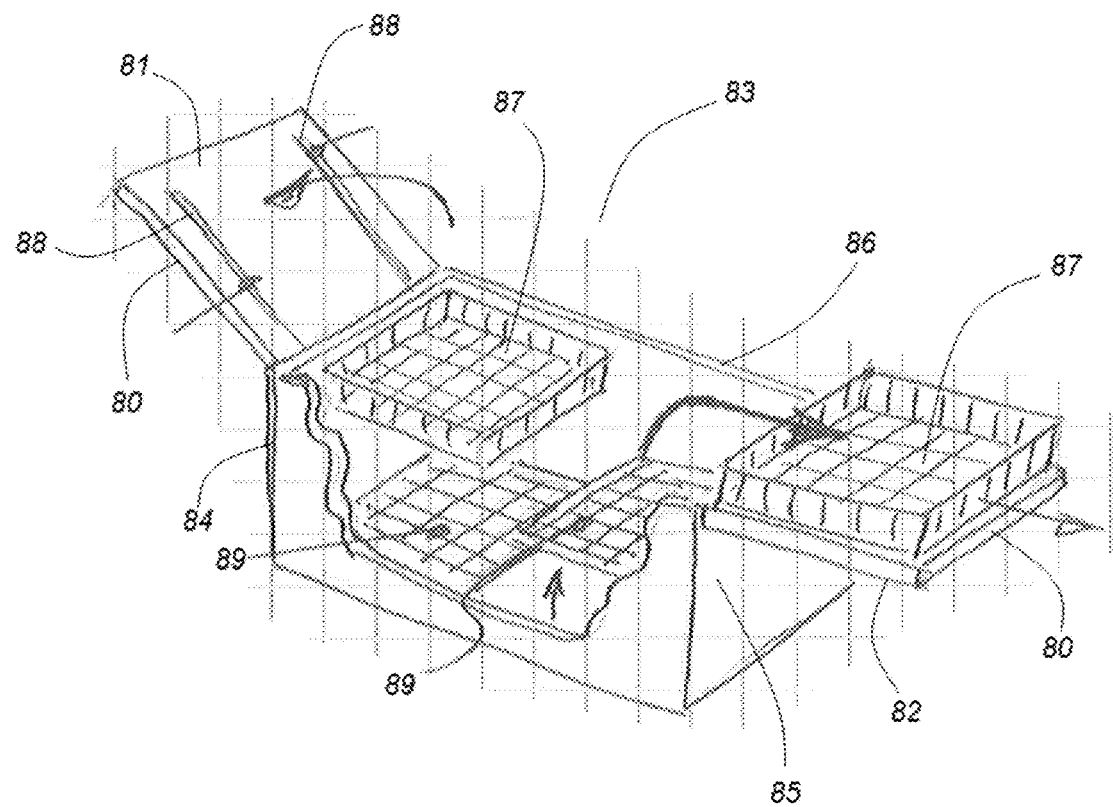
FIG. 20 is a perspective schematic of a chest freezer with a basket system that allows for improved access to lower shelves within the freezer.
Figure 21:
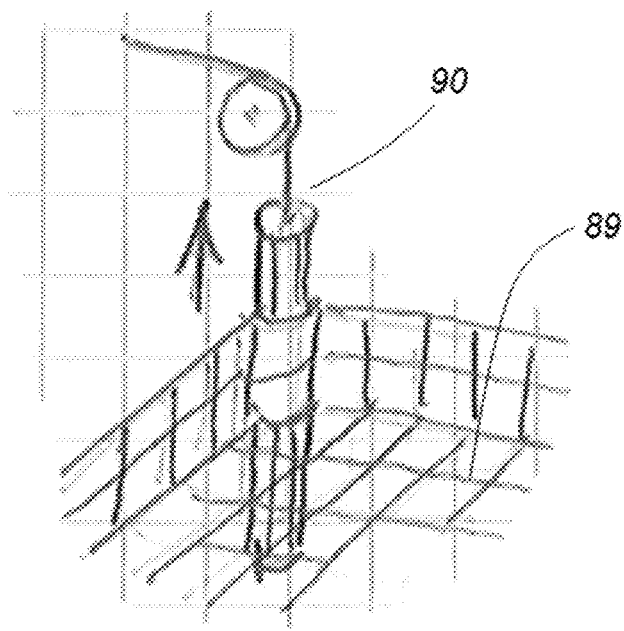
FIG. 21 is a perspective schematic of a counter-balanced cable system for use in the chest freezer of FIG. 20.

In a separate embodiment, as shown in FIG. 20, a freezer lid 80 comprises two flaps 81 and 82 for access to the interior of the freezer 83. In the embodiment shown in FIG. 20, the flaps 81 and 82 are hinged to the sides 84 and 85, respectively, of the freezer 83. In other embodiments, the flaps 81 and 82 are hinged to the back 86 of the freezer 83. An underside of the flaps 81 and 82 includes slide rails 88 that are configured to support baskets positioned on the underside of the flaps. As the flaps 81 and 82 are opened, middle baskets 87 are lifted to be flush with the top of the freezer 83, thus permitting the baskets to be slid onto the slide rails 88 of the open flaps 81 and 82. As the middle baskets 87 are lifted, the lower baskets 89 are lifted to a middle portion of the freezer 83 and are thus easily accessible by a user. In one embodiment, the baskets 87 and 89 are lifted via a counterbalanced cable system 90, as shown in FIG. 21. In other embodiments, the baskets 87 and 89 are lifted via an electric rack-and-pinion system, an air cylinder, or any other system used in such application. Once loaded, the middle baskets 87 are slid on the slide rails 88 back over the freezer 83, the flaps 81 and 82 are moved to the closed positions, and the middle baskets 87 are lowered into their original positions. The closing of the flaps 81 and 82 may be controlled by an air damper to prevent a hard close and minimal resistance to opening.

Figure 22:
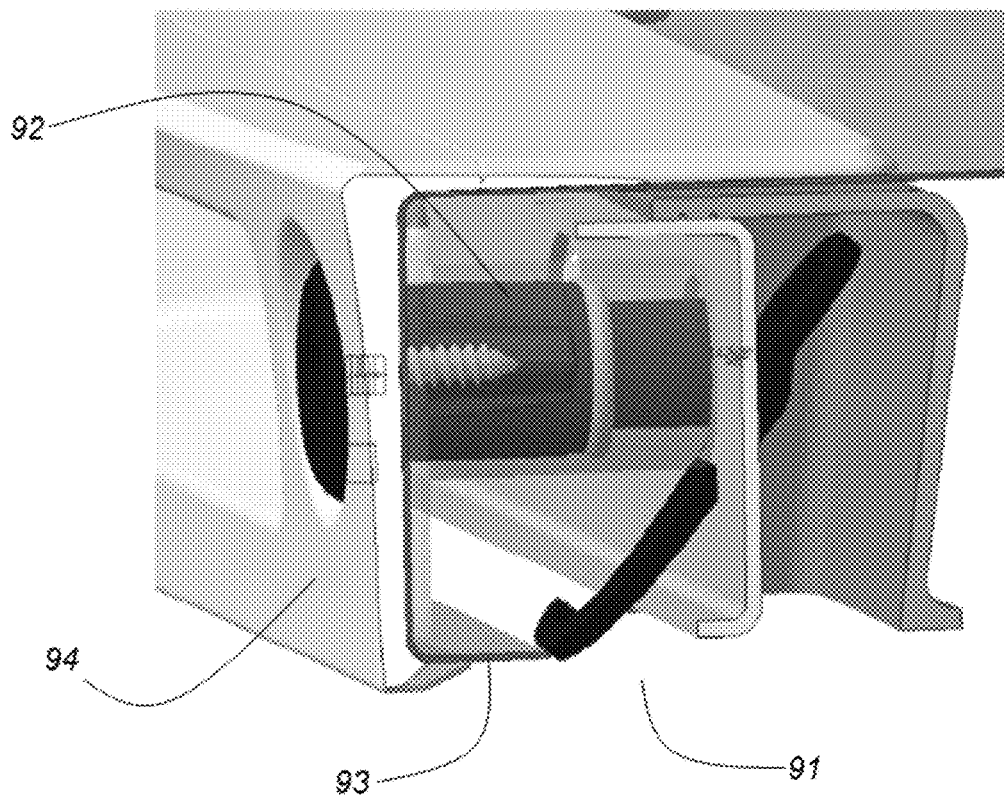
FIG. 22 is a lock system used on an angled-braker surface of a freezer.

In a separate embodiment, as shown in FIG. 22, a locking mechanism 91 for a non-flat surface of a freezer includes an angled rotating latch system 92 engaging on a latch catch 93 that is situated at an angled surface 94. This embodiment eliminates the need to add a bulky latch box into the usable area of a freezer and permits a lock to be incorporated into a freezer when there is not a sufficiently flat surface.

Figure 23:
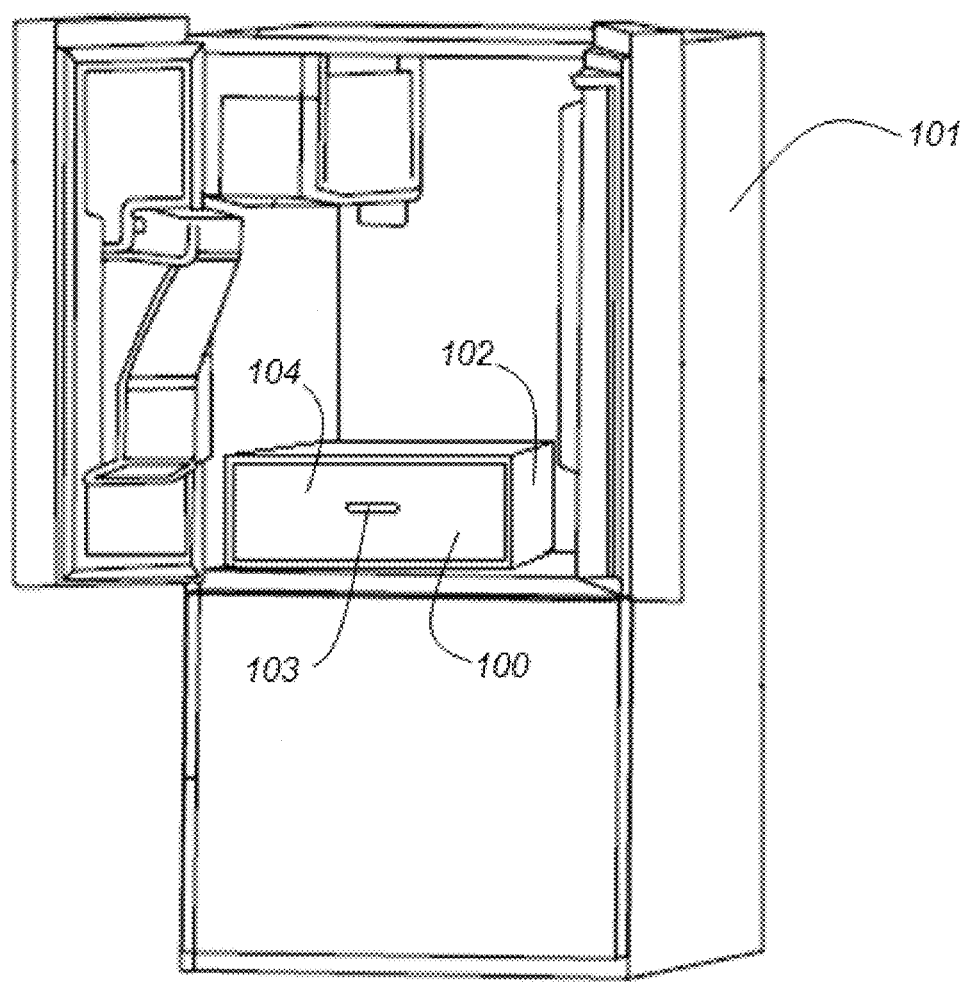
FIGS. 23 and 24 are perspective views of a removable insulated cooler that is stored within a housing a refrigerator.
Figure 24:
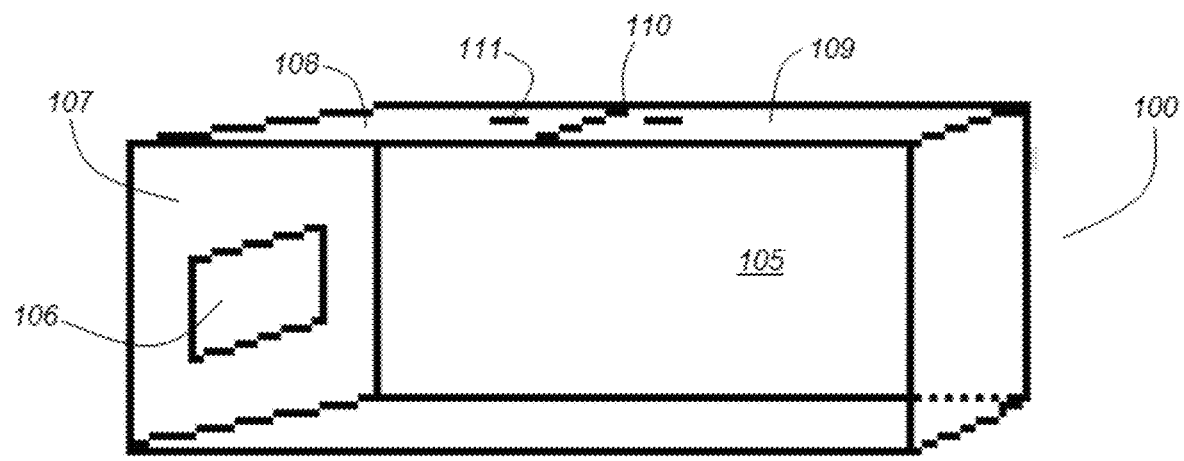

In a separate embodiment, as shown in FIGS. 23 and 24, an insulated cooler 100 is dimensioned and configured to be stored within a refrigerator 101. The cooler 100 allows for the transport of cold items from the refrigerator 101 to another location without having to first transfer the cold items to a separate cooler. In the illustrated example, the cooler 100 is designed to fit within a housing 102 of the refrigerator 101, so that the cooler 100 also functions as storage space when not removed from the refrigerator 101. In other embodiments, the cooler is designed to fit within a cavity or slot within the refrigerator. A user can remove the cooler 100 from the refrigerator 101 by pulling on a latch 103 on a front wall 104 of the cooler 100. When the cooler 100 is removed from the refrigerator 103, the latch 103 may also serve as a handle to carry the cooler 100. As shown in FIG. 24, wherein the front wall 104 is removed to show an inner compartment 105 of the cooler 100, a cold pack 106 is used with the cooler 100 in order to keep the stored items cold during transport. In the illustrated example, the cold pack 106 is stored within a side wall 107 of the cooler 100, in order to increase the amount of storage space within the interior compartment 105. The cooler 100 may also include doors 108, 109 that, when closed, form a top wall 110 of the cooler 100. The doors 108, 109 include latches 111 that allow a user to open the cooler 100 in order to retrieve stored cold items therein.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A crisper drawer for a refrigerator having a refrigerated compartment, the crisper drawer comprising:
   a plurality of side walls defining a storage chamber;
   an opening in a side wall to provide fluid communication between the storage chamber and the refrigerated compartment;

a multi-function filter cassette configured to be positioned within the opening, the multi-function filter cassette comprising:
a first filter configured to remove contaminants from a first air flow within the refrigerated compartment;
a second filter configured to remove contaminants and/or moisture from a second air flow within the storage chamber; and
a central wall configured to prevent fluid communication between the refrigerated compartment and the storage chamber.

2. The crisper drawer of claim 1, the multi-function filter cassette further comprising vertical slots disposed on opposing side portions of the multi-function filter cassette and the opening further comprising vertical rails configured to fit into the vertical slots.

3. The crisper drawer of claim 1, the multi-function filter cassette further comprising a notch on a top wall, wherein a tab adjacent to the opening in the side wall is configured to fit within the notch.

4. The crisper drawer of claim 1, the multi-function filter cassette further comprising a tab on a top wall, wherein the tab is configured to fit within a notch adjacent to the opening in the side wall.

5. The crisper drawer of claim 1, the central wall further comprising a first flange on a front face of the central wall that is configured to hold the first filter.

6. The crisper drawer of claim 5, the central wall further comprising a second flange on a back face of the central wall that is configured to hold the second filter.

7. The crisper drawer of claim 1, wherein the first filter and the second filter are individually detachably mounted to the multi-function filter cassette.

8. The crisper drawer of claim 1, wherein the first filter and the second filter each independently snap fit into the multi-function filter cassette.

9. The crisper drawer of claim 1, wherein, at an installed condition, the multi-function filter cassette is flush with the side wall of the crisper drawer when positioned within the opening.

10. The crisper drawer of claim 1, the first filter comprising activated carbon.

11. The crisper drawer of claim 1, the second filter comprising activated carbon, an antimicrobial agent, an ethylene-absorbing agent, and/or a moisture-wicking material.

12. A multi-function filter cassette comprising:
a first filter configured to remove contaminants from a first air flow within a first compartment;
a second filter configured to remove contaminants and/or moisture from a second air flow within a second compartment adjacent to the first compartment; and
a central wall configured to hold the first filter and to hold the second filter, and further configured to prevent fluid communication between the first and second compartments.

13. The multi-function filter cassette of claim 12, further comprising vertical slots disposed on opposing side portions of the central wall.

14. The multi-function filter cassette of claim 12, further comprising a notch on a top wall.

15. The multi-function filter cassette of claim 12, further comprising a tab on a top wall.

16. The multi-function filter cassette of claim 12, the central wall further comprising a first flange on a front face of the central wall that is configured to hold the first filter.

17. The multi-function filter cassette of claim 16, the central wall further comprising a second flange on a back face of the central wall that is configured to hold the second filter.

18. The multi-function filter cassette of claim 12, the first filter comprising activated carbon.

19. The multi-function filter cassette of claim 12, the second filter comprising activated carbon, an antimicrobial agent, an ethylene-absorbing agent, and/or a moisture-wicking material.

20. The multi-function filter cassette of claim 12, wherein a refrigerated compartment of a refrigerator defines said first compartment, and a crisper drawer defines said second compartment, and wherein the cassette is configured to be inserted into an opening in a side wall of said crisper drawer to thereby prevent fluid communication between the first and second compartments.

* * * * *